(12) United States Patent
Zimmerman

(10) Patent No.: US 6,192,592 B1
(45) Date of Patent: Feb. 27, 2001

(54) CUTTING GUIDE DEVICE

(76) Inventor: Dare Russell Zimmerman, 341 Lodor Street, Ancaster, Ontario (CA), L9G 2Z3

(*) Notice: Subject to any disclaimer, the term of this patent is extended or adjusted under 35 U.S.C. 154(b) by 0 days.

(21) Appl. No.: 09/369,187

(22) Filed: Aug. 6, 1999

(51) Int. Cl.[7] .................................................. B27B 27/02
(52) U.S. Cl. ............................... 30/371; 30/376; 83/574; 83/745
(58) Field of Search ............................ 30/371, 372, 373, 30/374, 375, 376, 377, 382, 383, 381; 83/574, 745

(56) References Cited

U.S. PATENT DOCUMENTS

| | | | |
|---|---|---|---|
| 2,376,270 | * 5/1945 | Paulson | 83/745 |
| 3,026,918 | * 3/1962 | Dooley | 30/371 |
| 3,051,203 | * 8/1962 | Hayden | 30/371 |
| 3,586,077 | * 6/1971 | Pease | 30/376 |
| 4,146,962 | * 4/1979 | Grube | 30/371 |
| 4,173,240 | * 11/1979 | Boyce | 83/745 |
| 4,377,910 | 3/1983 | Landry, Jr. | 30/383 |
| 4,476,759 | 10/1984 | Aderneck | 83/574 |
| 4,949,613 | * 8/1990 | Bone | 83/574 |
| 5,429,438 | 7/1995 | Wood | 384/42 |

* cited by examiner

*Primary Examiner*—Hwei-Siu Payer
(74) *Attorney, Agent, or Firm*—Patrick J. Hofbauer

(57) ABSTRACT

A cutting device is disclosed, comprising a rail attachable to a workface and defining a translational axis when attached thereto; a carriage mounted on the rail and adapted for constrained movement along the translational axis; a turret assembly attached to the carriage for movement therewith and adapted for rotation relative thereto about a pivot axis disposed normal to the translational axis; and a gripping assembly adapted to grip a chainsaw with a cutting plane defined by a cutting bar thereof oriented normal to the pivot axis, the gripping assembly being attached to the turret assembly for rotation therewith, while gripping the chainsaw, between a raised position, whereat the cutting bar is disposed frontwardly from the workface, and a lowered position, whereat the cutting bar intersects the workface. The carriage has two laterally spaced lugs having respective bores centred about the pivot axis. The turret assembly comprises a turret head and a shaft, the shaft being mounted within respective bearing assemblies mounted with the bores, for rotation about the pivot axis. The gripping assembly comprises a channel defined within the turret head, a backing plate and a laterally spaced clamping disc positioned within the channel and a threaded rod, extending from the clamping disc to a head member and engaged in a threaded bore in the turret head, the head member being manually engageable for rotation of the threaded rod in the threaded bore to urge the clamping disc towards the backing plate to grip the cutting bar.

23 Claims, 7 Drawing Sheets

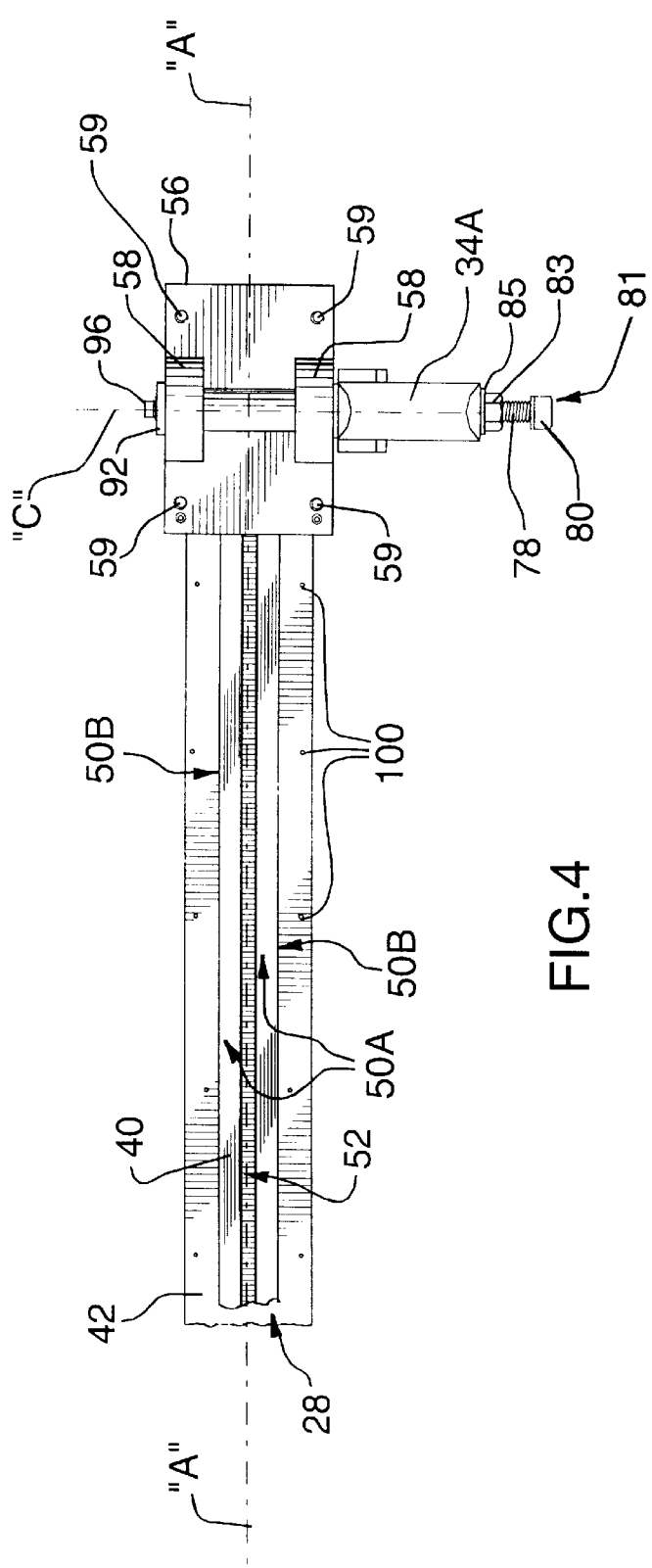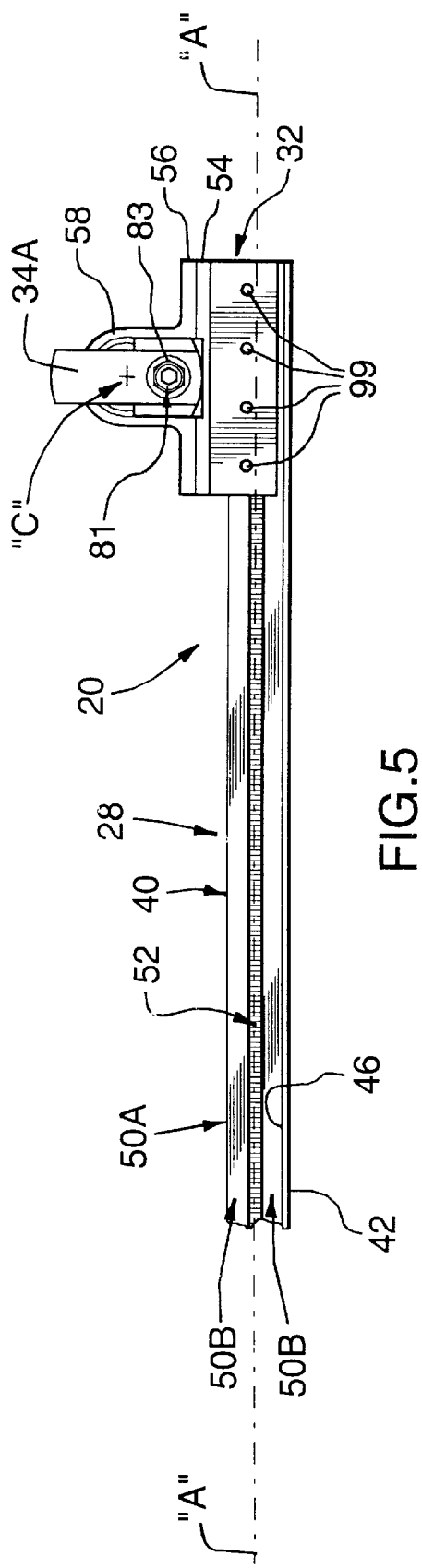

CUTTING GUIDE DEVICE

FIELD OF THE INVENTION

The present invention relates to the field of chainsaw attachments and more particularly to a cutting guide device adapted for selective, releasable attachment to a chainsaw, which enables a workpiece to be safely and precisely cut.

BACKGROUND OF THE INVENTION

The construction of dwellings utilizing logs stacked upon one another is popularly practised in regions where timber is available. Hand-held chainsaws have proven to be well-suited for carrying out the rough cutting operations required in this type of construction, such as the felling of trees and cutting is of same to length, and are widely used therefor. However, it is also necessary that openings be provided in stacked-log structures, so as to enable the insertion of doors or windows therein. Hand-held chainsaws are known to have been used for these purposes, but it has proven difficult for hand-held chainsaws to be manually-directed with the necessary level of precision required to produce aesthetically-pleasing openings within which doors or windows may be readily inserted and mounted. Moreover, even for highly-skilled chainsaw operators, handling mishaps are inevitable, which can require the costly replacement of timber, and also hold the potential of causing serious injury to the operator of the chainsaw and/or to bystanders.

Chainsaw guides are known in the art, particularly for use in the processing of logs into dimensional lumber, such as that disclosed in U.S. Pat. No. 4,476,759 (Aderneck), issued Oct. 16, 1984. The Aderneck patent discloses a chainsaw guide attachment comprising a rigid guide channel, a threaded cylinder attached to the guide channel, a threaded shaft mechanically engaged within the threaded cylinder, and a clamp attached to the threaded shaft and adapted to grip a conventional hand-held chainsaw. The clamp comprises twin set screws and a hardened backing plate between which the cutting bar of the chainsaw may be positioned. In preparation for use, the operator is required only to clamp the attachment to the chainsaw by manipulation of the set screws against the cutting blade, and fasten a guide rail, such as a common 2"×4" wooden stud, to the log. Thereafter, the guide channel may be fitted upon the guide rail, and the chainsaw be caused to cut the log by pivotal rotation of the threaded shaft in the threaded cylinder; once such pivotal rotation is completed, the guide channel may be repositioned on the guide rail, and the process repeated along the entire length to be cut.

The twin set screws and hardened backing plate of the Aderneck attachment which effect the gripping of the chainsaw have been known to cause damage to chainsaw guide bars in use, but otherwise, attachments of this type have generally proven useful for the rough-cutting of logs into dimensional lumber, such as is required for framing purposes. However, the Aderneck attachment suffers in several aspects when employed in the provision of openings in stacked log structures. Firstly, due to the utilisation of the threaded shaft and cylinder pivot assembly in the Aderneck attachment, the displacement of the chainsaw relative to the guide channel varies during rotation of the chainsaw. This variance results in lateral movement of the chainsaw blade during cutting, thereby producing a contoured cut surface which is poorly suited for the mounting of door or window frames thereupon and which may require subsequent shimming, sanding or planing. Moreover, the cut edge produced is jagged and aesthetically unpleasing. As well, as conventional chainsaws are not adapted for lateral blade movement, the aforementioned variance results in unnecessarily high levels of operator effort being required to effect pivotal rotation, which is further accentuated by the frictional forces resident in the pivot assembly itself, and by the absence of means to retain the chainsaw against the structure; the requirement that the operator physically support the chainsaw and guide attachment during operation, coupled with the high effort levels required to effect pivotal rotation of the chainsaw during operation, results in high levels of operator fatigue, leading to handling mishaps, property damage and operator injury.

SUMMARY OF THE INVENTION

It is an object of a preferred embodiment of the present invention to overcome, inter alia, the shortcomings of the prior art by providing a cutting guide device adapted for selective, releasable attachment to a chainsaw, which enables an operator to safely provide an opening in a stacked-log structure.

It is a further object of the preferred embodiment of the present invention to provide a cutting guide device which satisfies the aforementioned objects and which does not require the operator to support the chainsaw and cutting guide device during operation.

It is a further object of the preferred embodiment of the present invention to provide a cutting guide device which satisfies the aforementioned objects and which does not require the operator to exert unnecessarily high levels of effort during operation.

It is a further object of the preferred embodiment of the present invention to provide a cutting guide device which satisfies the aforementioned objects and which provides an aesthetically pleasing opening that is well-suited for the mounting of door or window frames thereupon.

It is a further object of the preferred embodiment of the present invention to provide a cutting guide device which satisfies the aforementioned objects and which is economical to manufacture and yet precise and robust in operation.

It is yet a further object of the preferred embodiment of the present invention to provide a cutting guide device which satisfies the aforementioned objects and which does not damage the guide bar of the attached chainsaw.

These and other objects are addressed by the preferred embodiment of the present invention.

According to one aspect of the invention, there is provided a cutting guide device which is adapted for use with a chainsaw and a workpiece having a substantially vertical face to be cut, said chainsaw being of the type having a motor housing portion, a substantially planar guide bar portion rigidly projecting from the motor housing portion and a cutting chain portion surrounding a perimeter of the guide bar portion. The cutting guide device comprises a rail means adapted for selective, removable, rigid attachment to the vertical face of the workpiece. The rail means defines a vertical translational axis when operatively attached to the face as aforesaid. A carriage means is also provided, and is mounted on the rail means for constrained translational movement parallel to the vertical translational axis. A turret means is attached to the carriage means for translational movement therewith and is adapted for pivotal rotation relative to the carriage means about a horizontal pivot axis disposed normal to the vertical translational axis. A chainsaw gripping means adapted to selectively, rigidly grip the chainsaw by the guide bar portion thereof with a cutting plane defined by the guide bar portion being vertically oriented and normal to the horizontal pivot axis, is also disclosed. The chainsaw gripping means is mounted on the turret means for rotation therewith, while gripping said chainsaw as aforesaid, between a raised position, whereat the guide bar portion and cutting chain portion are disposed frontwardly from said face, and a lowered position, whereat said guide bar portion and cutting chain portion intersect said face in cutting relation, thereby to cut said workpiece along the cutting plane.

According to another aspect of the invention, the horizontal pivot axis is preferably substantially parallel to a mounting plane defined by the face of the workpiece.

According to another aspect of the invention, the chainsaw gripping means is preferably adapted to selectively, rigidly grip the chainsaw as aforesaid with the cutting plane defined by the guide bar portion oriented substantially normal to the mounting plane defined by the face of the workpiece.

According to another aspect of the invention, the turret means preferably comprises a head portion and a shaft portion laterally extending from the head portion, the shaft portion being rotatably mounted to the carriage means for said pivotal rotation, the gripping means being mounted on the head portion for rotation therewith as aforesaid.

According to another aspect of the invention, the carriage means preferably comprises a guide block, mounted on the rail means for said contrained translational movement, and a turret mounting plate, rigidly mounted upon the guide block.

According to another aspect of the invention, the carriage means prefereably further comprises a shaft receiving lug portion projecting frontwardly from said turret mounting plate, said shaft receiving lug portion having a substantially cylindrical bore therein centered about the horizontal pivot axis.

According to another aspect of the invention, the shaft portion is preferably rotatably mounted as aforesaid within the cylindrical bore for said pivotal rotation about the horizontal pivot axis.

According to another aspect of the invention, the shaft portion is preferably rotatably mounted within the cylindrical bore as aforesaid by means of a ring bearing assembly positioned within the bore of said lug portion. The ring bearing assembly comprises an inner race and a concentric outer race. The inner race and outer race are rotatably mounted one within the other, the outer race being rigidly mounted to the lug portion of the carriage means and the inner race being in frictionally-engaged surrounding receipt of the shaft portion.

According to another aspect of the invention, the carriage means preferably has two frontwardly projecting shaft receiving lug portions, laterally spaced one from another, with respective cylindrical bores of said lug portions aligned one with another to accept said shaft portion within respective ring bearing assemblies mounted within said cylindrical bores as aforesaid.

According to another aspect of the invention, the chainsaw gripping means preferably comprises a channel defined within the head portion of the turret means. The channel accepts, in throughpassing relation, the guide bar portion and cutting chain portion of the chainsaw, and is oriented substantially transverse to the horizontal pivot axis. The channel has a first sidewall, proximal to the shaft portion, and a second sidewall, laterally spaced in opposed relation from the first sidewall and distal to the shaft portion.

According to another aspect of the invention, the chainsaw gripping means preferably further comprises a backing plate rigidly mounted upon the first sidewall and projecting laterally into the channel for contacting relation with a first side of said guide bar portion.

According to another aspect of the invention, the chainsaw gripping means preferably further comprises a clamping disc positioned in the channel substantially laterally spaced from the backing plate. Means for adjustably, selectively urging said clamping disc towards the backing plate for contacting relation with an opposite side of the guide bar portion are also provided. Thereby, the chainsaw may be clampingly gripped as aforesaid by the guide bar portion thereof when said guide bar portion is operatively positioned between said clamping disc and said backing plate.

According to another aspect of the invention, the means for adjustably, selectively urging the clamping disc towards the backing plate preferably comprises a threaded rod means extending from said clamping disc to a head member. The threaded rod means is operatively mechanically engaged in a threaded bore passing through the head portion of the turret means, the head member being manually engageable for rotation of the threaded rod means in the threaded bore.

According to yet another aspect of the invention, the backing plate and clamping disc are preferably constructed from unhardened steel.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described hereinbelow.

BRIEF DESCRIPTION OF THE DRAWINGS

FIG. 4 is a front elevational view of the cutting guide device of FIG. 1;

FIG. 5 is a side elevational view of the cutting guide device of FIG. 1;

DETAILED DESCRIPTION OF A PREFERRED EMBODIMENT

Figure 6:
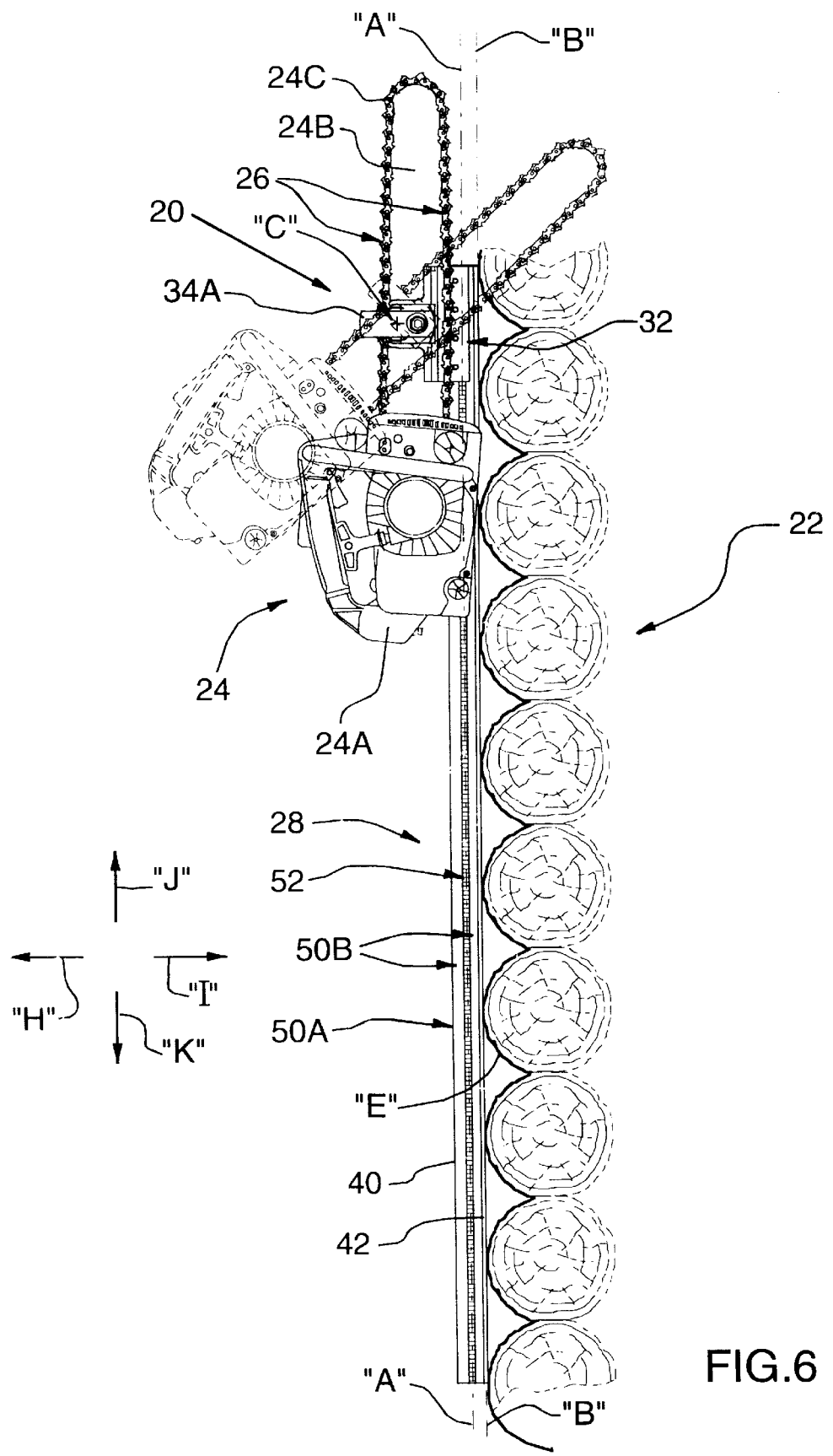
FIG. 6 is a side elevational view of the cutting guide device of FIG. 1, shown operatively attached to a vertically stacked log wall illustrated in phantom outline and with a chainsaw attached to the cutting guide device, with the cutting guide device and attached chainsaw being shown in solid outline in a raised position, and also showing, in phantom outline, a lowered position of the cutting guide device and attached chainsaw.

Referring generally to FIG. 6 of the drawings, a preferred embodiment of a cutting guide device according to the present invention is shown and indicated by the general reference numeral 20. In FIG. 6, the cutting guide device 20 is illustrated operatively mounted upon a workpiece 22, namely, a vertically stacked log wall, having a substantially vertical face "E" to be cut; for clarity, such that face "E" may be seen, only substantially vertical face "E" shown in solid outline, with the balance of the workpiece 22 illustrated in phantom outline. Additionally, to more clearly illustrate a typical application of the preferred embodiment of the cutting guide device 20, a chainsaw 24 operatively attached to the cutting guide device 20 is also illustrated, said chainsaw 24 being of the conventional type having a motor housing portion 24A, a substantially planar guide bar portion 24B rigidly projecting from said motor housing portion 24A and a cutting chain portion 24C surrounding a perimeter 26 of said guide bar portion 24B.

Figure 1:
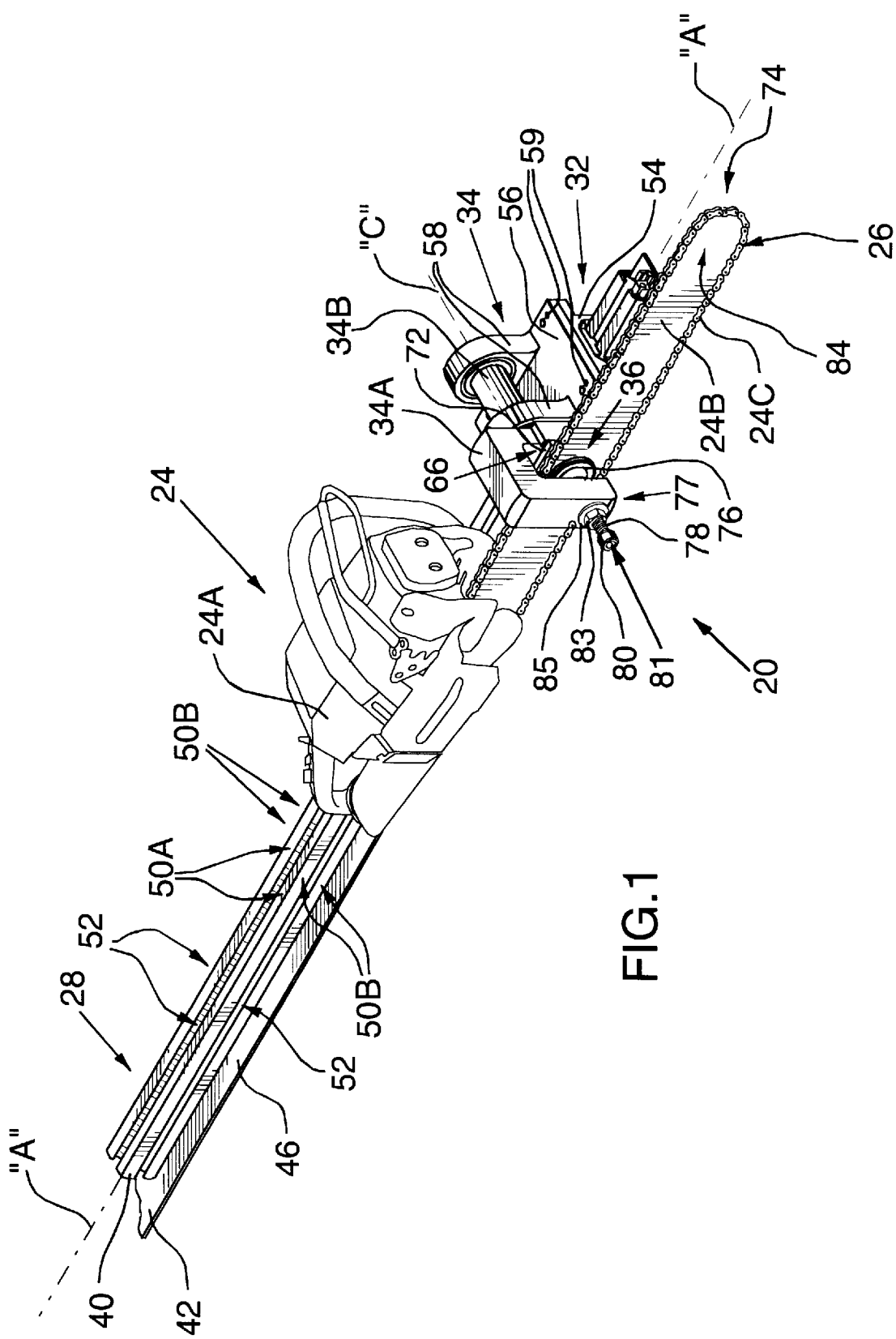
FIG. 1 is a perspective view of a cutting guide device according to a preferred embodiment of the present invention, shown with a chainsaw operatively attached thereto.
Figure 2:
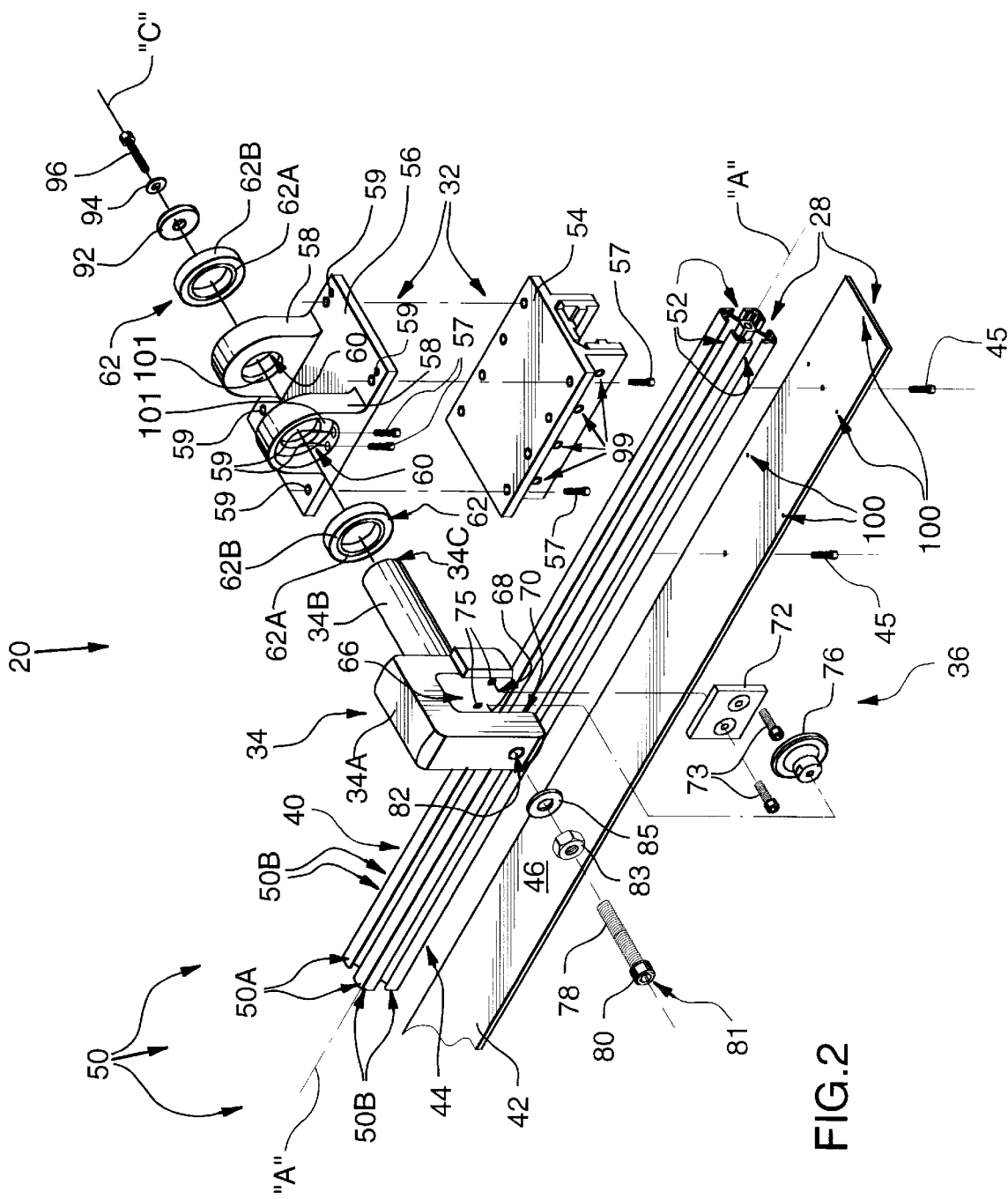
FIG. 2 is an exploded perspective view of the cutting guide device of FIG. 1, shown with the chainsaw removed.
Figure 3:
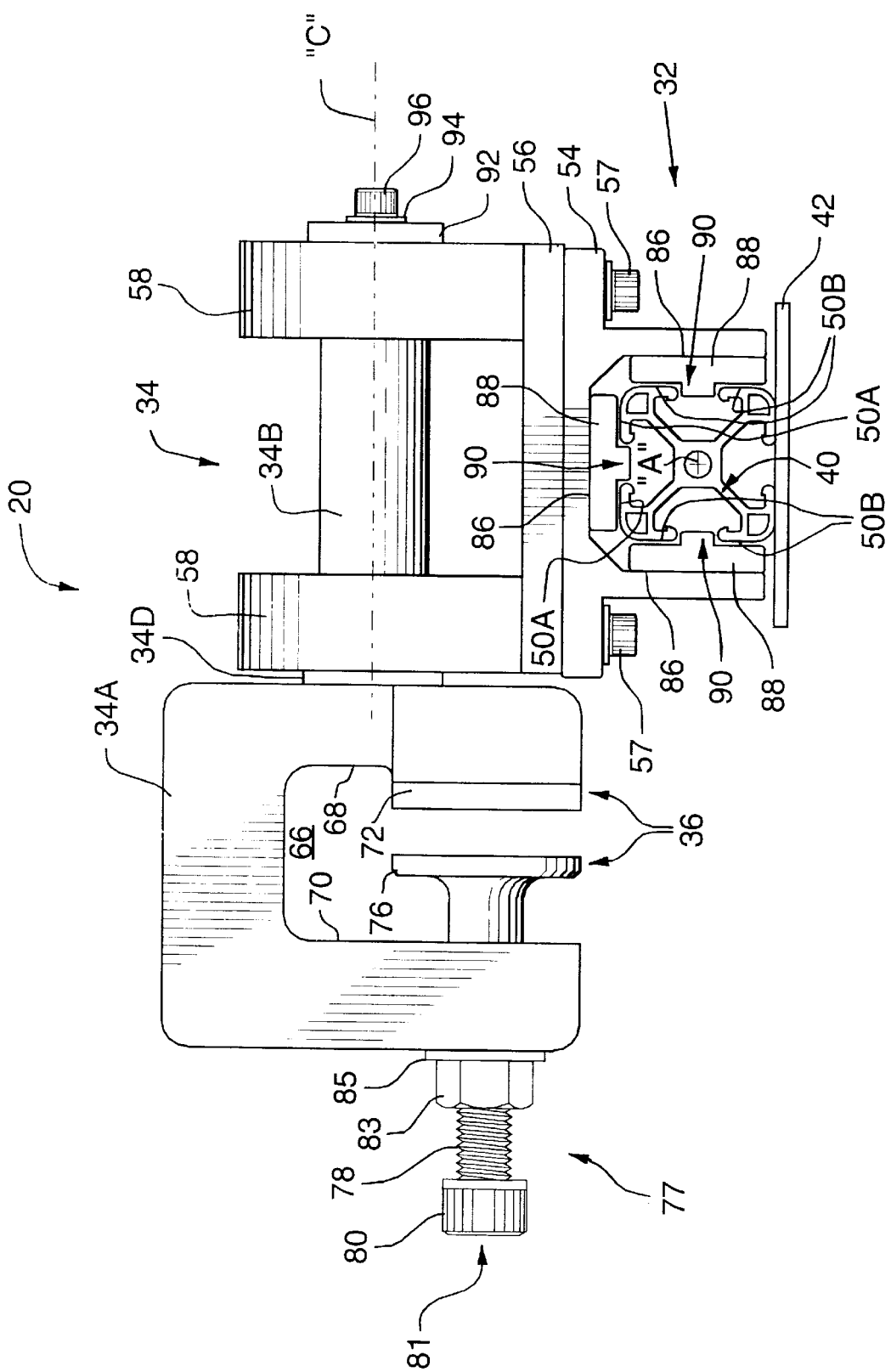
FIG. 3 is a top elevational view of the cutting guide device of FIG. 1.
Figure 7:
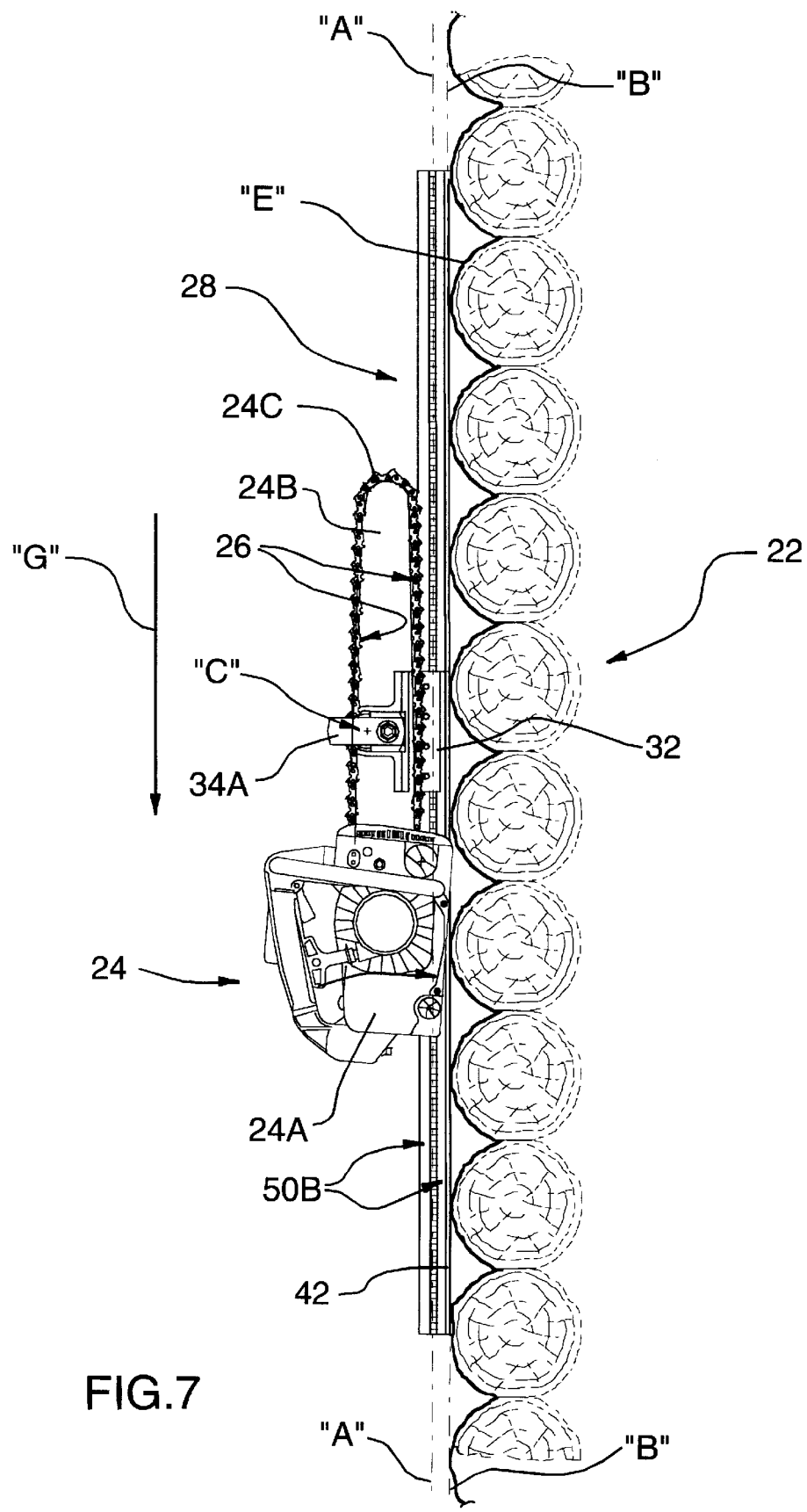
FIG. 7 is a view similar to FIG. 6, with the cutting guide device and attached chainsaw being disposed downwardly along the translational axis.
Figure 8:
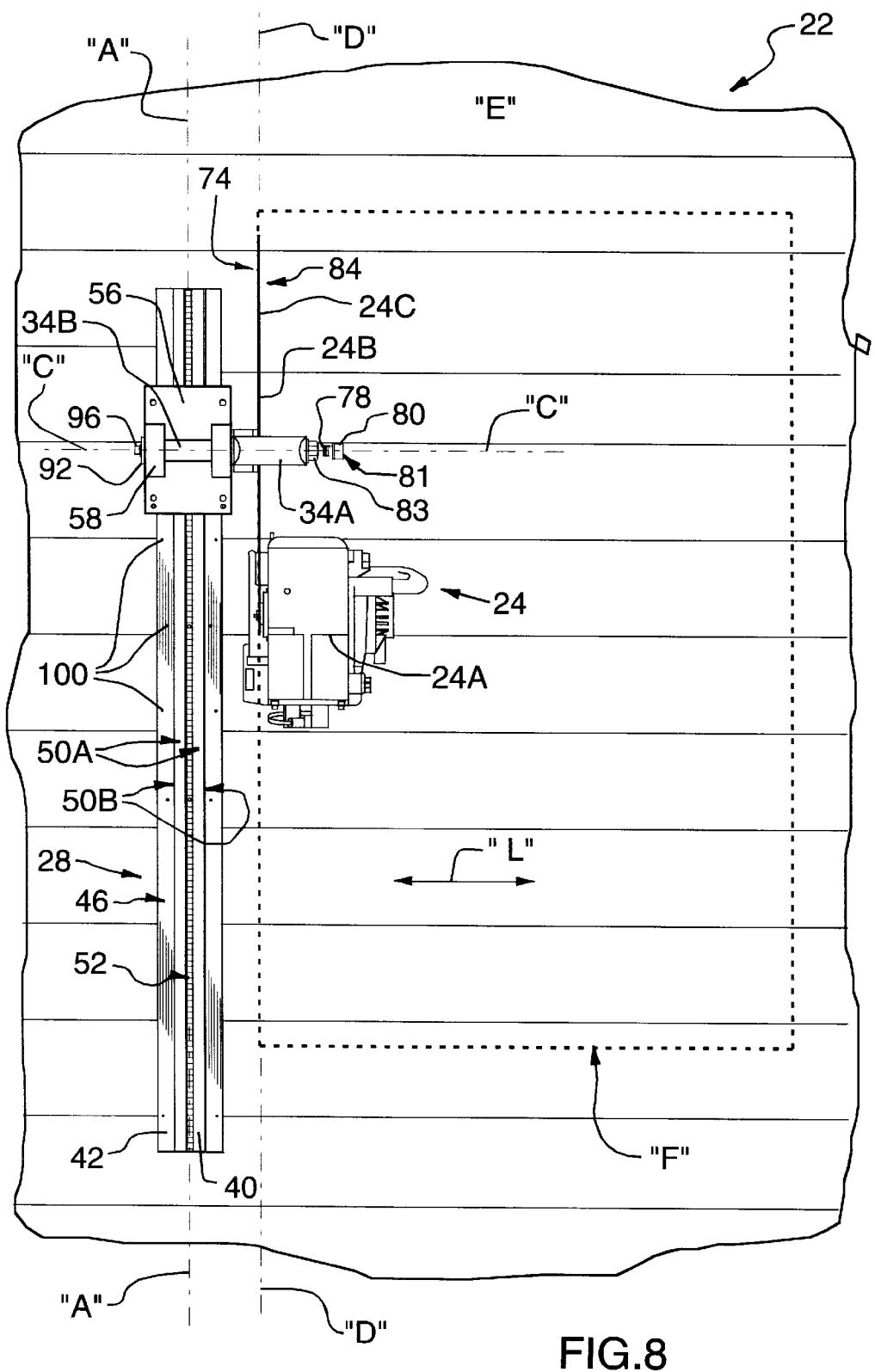
FIG. 8 is a front elevational view of the cutting guide device, vertically stacked log wall and chainsaw of FIG. 6, with an opening to be provided in the vertically stacked log structure being shown in dotted outline.

The precise manner of construction and operation of the inventive cutting guide device 20, including its manner of attachment to the workpiece 22 and chainsaw 24, will be more particularly described in following paragraphs. However, it will presently be understood that the cutting guide device 20 comprises a rail means 28 adapted for selective, removable, rigid attachment to the face "E" of the workpiece 22, thereby to mount the cutting guide device 20 upon the workpiece 22. When the cutting guide device 20 is operatively mounted upon the workpiece 22 as illustrated in FIGS. 6, 7 and 8 and later described, the rail means 28 defines a substantially vertical translational axis "A". As best seen in FIGS. 2 and 3, a carriage means 32 is also provided in the present invention and is mounted on the rail means 28 in a manner, which again will be more fully described in following paragraphs, such that the carriage means 32 is retained proximal to the rail means 28 and capable of movement relative thereto parallel to the vertical translational axis "A", only; for the purpose of this specification and the claims appended hereto, this feature shall be termed "constrained translational movement". A turret means 34 is attached to the carriage means 32 for translational movement therewith. The turret means 34 is also adapted for pivotal rotation relative to the carriage means 32 about a horizontal pivot axis "C" disposed normal to the vertical translational axis "A" and substantially parallel to a mounting plane "B" defined by the face "E" of the workpiece 22, as best seen in FIG. 6. A chainsaw gripping means 36 is also provided, and is adapted to selectively, rigidly grip the chainsaw 24 by the guide bar portion 24B thereof, when the cutting guide device 20 is operatively mounted to the workpiece 22, as illustrated in FIGS. 6, 7 and 8. A cutting plane "D", shown in FIG. 8 and defined by said guide bar portion 24B, is oriented normal to the horizontal pivot axis "C" and to the mounting plane "B" (seen in FIG. 7). The chainsaw gripping means 36 is mounted on the turret means 34 for rotation therewith, while gripping said chainsaw 24 as aforesaid, between a raised position, whereat the guide bar portion 24B and cutting chain portion 24C of the chainsaw 24 are disposed frontwardly from the face "E", as seen in solid outline in FIG. 6, and a lowered position, whereat the guide bar portion 24B and cutting chain 24C portion intersect face "E" in cutting relation, as illustrated in phantom outline in FIG. 6. In the raised position, the cutting chain portion 24C does not make cutting contact with the workpiece 22. In the lowered position (and some intermediate positions), the cutting chains portion 24C does make cutting contact with the workpiece 22.

The preferred embodiment of the cutting guide device 20 will now be more particularly described. For greater certainty in this regard, it should be understood that arrows "H", "I", "J" and "K" shown in FIG. 6 indicate, respectively, the "front", "back", "up" and "down" orientations as the terms are used in this description and the appended claims, while arrow "L" shown in FIG. 8 indicates the "lateral" orientation.

With reference generally to FIGS. 2, 3, 4 and 5, it will be seen that the turret means 34 comprises a generally "U" shaped head portion 34A and a shaft portion 34B laterally extending from said head portion 34A. The carriage means 32 includes a turret mounting plate 56, with two lug portions 58 each projecting frontwardly therefrom, laterally spaced one from the other. Each of the lug portions 58 has a substantially cylindrical bore 60 therein centred about the horizontal pivot axis "C", said bores being aligned one with the other, with said shaft portion 34B being rotatably mounted within said bores 60. The shaft portion 34B is rotatably mounted as aforesaid by means of a respective conventional ring bearing assembly 62 positioned within the bore 60 of each lug portion 58. The ring bearing assembly 62 preferably comprises an inner race 62A and a concentric outer race 62B. Each outer race 62B is rigidly mounted to a respective one of the lug portions 58, in press-fit relation with the bore 60 of said respective one of the lug portions 58. The inner races 62A are in frictionally-engaged surrounding receipt of the shaft portion 34B, and are, respectively, rotatably mounted within the outer races 62B, by any conventional means. It will be evident that mounting of the shaft portion 34B and bearing assemblies 62 as aforesaid will enable rotation of said shaft portion 34B within the bores 60 about the horizontal pivot axis "C". In the preferred embodiment shown, there is provided on the shaft portion 34B a shaft collar portion 34D proximal to the head portion 34A (best seen in FIG. 3). An over-bore sized end cap 92 is also provided, said end cap 92 being rigidly attached to a tail end 34C of the shaft portion 34B by a conventional washer 94 and bolt assembly 96, the bolt 96 of which engaging a corresponding threaded socket (not shown) in said tail end 34C. As well, each lug portion 58 comprises a circular flange portion 101 adjacent an inner end of each bore 60. The shaft collar portion 34D and end cap 92 bear, respectively, against the inner race 62A of the bearing assembly 62 proximal, and distal, to the head portion 34A, and the outer races 62B bear against the circular flange portions 101, thereby to collectively retain said shaft portion 34B as against axial movement within the bores 60.

In the preferred embodiment illustrated, the chainsaw gripping means 36 comprises a channel 66 defined (see FIG. 3) between the arms of the head portion 34A of the turret means 34 to accept, in throughpassing relation, the guide bar portion 24B and the top segment of the cutting chain portion 24C of the chain saw 24. The channel 66 is oriented substantially transverse to, and is preferably intersected by, the horizontal pivot axis "C". The channel 66 has a first sidewall 68, proximal to the shaft portion 34B, and a second sidewall 70, laterally spaced in opposed relation from the first sidewall 68, and distal to the shaft portion 34B. A backing plate 72 is rigidly mounted upon the first sidewall 68 by bolts 73 (see FIG. 2), which bolts 73 extend through the backing plate 72 to engage corresponding threaded bores 75 in the first sidewall 68. The backing plate 72 projects laterally into the channel 66 for contacting relation with a first side 74 of said guide bar portion 24B. A clamping disc 76 is positioned in the channel 66 substantially laterally spaced from the backing plate 72, and a means for adjustably, selectively urging said clamping disc 76 towards said backing plate 72 for contacting relation with an opposite side 84 of the guide bar portion 24B is also provided, said means being designated by general reference numeral 77. Said means 77 for urging said clamping disc 76 towards said backing plate 72 as aforesaid comprises a threaded rod means 78 extending from the clamping disc 76 to a head member 80. The threaded rod means 78 is operatively mechanically engaged in a threaded bore 82 which passes through the head portion 34A of the turret means 34. The head member 80 is manually engageable for rotation of said threaded rod means 78 in said threaded bore 82, thereby to urge said clamping disc 76 towards the backing plate 72 as aforesaid to clampingly grip said chainsaw 24 as aforesaid by the guide bar portion 24B thereof when said guide bar portion 24B is operatively positioned between said clamping disc 76 and said backing plate 72. In the preferred embodiment illustrated, the head member 80 includes a conventional hex socket receptacle 81 for manual engagement of said head member 80 as aforesaid, but this aspect of the invention is not limited to manual engagement in this manner, and any conventional manner of manual engagement may be used. A lock nut 83 and lock washer 85 are also provided, which are threaded upon the threaded rod means 78, and may selectively be manipulated to engage the head portion 34A of the turret means 34, thereby to restrict rotation of the threaded rod means 78 when the chainsaw 24 is operatively gripped by the chainsaw gripping means 36. The backing plate 72 and clamping disc 76 are preferably constructed from unhardened steel, in order to limit damage to the cutting chain 24C in the event that same contacts the backing plate 72 or clamping disc 76.

The rail means 28 of the preferred embodiment illustrated comprises a rib member 40 and a mounting plate member 42. The mounting plate member 42 includes a plurality of mounting holes 100 and is selectively, removably, rigidly attached to the face "E" of the workpiece 22 by conventional fastening means, such as woodscrews (not shown) received within said holes 100 and engaged to the face "E". The rib member 40 is preferably extruded from aluminum, and has a back surface 44 rigidly mounted upon a front surface 46 of the mounting plate member 42 by nut and bolt assemblies 45. When the mounting plate member 42 is operatively attached to the face "E" as illustrated, the rib member 40 defines the aforementioned vertical translational axis "A". The rib member 40 further comprises three bearing surfaces 50, comprising a front bearing surface 50A and laterally disposed side bearing surfaces 50B. Each of the bearing surfaces 50 are oriented substantially parallel to the vertical translational axis "A" and have a respective generally centrally positioned slot 52 therein oriented parallel to the vertical translational axis "A".

The carriage means 32 comprises a guide block 54 upon which the turret mounting plate 56 is rigidly mounted. Such mounting is accommodated in the preferred embodiment by bolts 57 which extend in the direction of arrow "H" through the guide block 54 to engage corresponding threaded sockets 59 in the turret mounting plate 56 and in the lug portions 58 of the carriage means 32. The guide block 54 comprises three guide surfaces 86, each guide surface 86 being associated with a respective one of said bearing surfaces 50 and disposed adjacent thereto. Three wear pads 88 are also provided, each wear pad 88 being rigidly mounted upon a respective one of the guide surfaces 86 in sliding contact with the bearing surface 50 associated with said respective one of the guide surfaces 86. In the preferred embodiment illustrated, the wear pads 88 are mounted by machine screws 99 (see FIGS. 2 and 5) countersunk in the guide block 54, and are formed from a durable material having high lubricity, such as ultra high molecular weight polyethylene.

Additionally, each wear pad 88 has an alignment key 90 received within the slot of the bearing surface 50 associated with the guide surface 86 upon with said wear pad 88 is mounted (see FIG. 3), thereby to cause said carriage means 32 to be engaged with said rail means 28 for constrained translational movement, as aforedescribed.

It will be appreciated that, in the preferred embodiment illustrated, the rib member 40 of the rail means 28 and the guide block 54 of the carriage means 32 are of types such as are described in U.S. Pat. No. 5,429,438 (Wood), issued Jul. 4, 1995, the teachings of which patent are hereby incorporated by reference. However, it will of course be understood that the scope of the present invention is not to be limited to embodiments which incorporate the use of rail means and carriage means as herein specifically described, and it will further be understood that other various changes in size and shape of parts may be made without departing from the spirit or scope of the invention, notwithstanding that only a single specific and preferred embodiment of the present invention is herein shown and described.

The manner of operation of the cutting guide device 20 will now be described with particular reference to FIGS. 6, 7 and 8. In preparation for use, the cutting guide device 20 is operatively attached to the workpiece 22 to be cut, and a chainsaw 24 is operatively attached to the cutting guide device 20, as illustrated in FIGS. 6, 7 and 8 and as previously discussed. Thereafter, the carriage means 32 is positioned along the rail means 28, and the chainsaw 24 is activated. Rotation of the chainsaw 24 from the raised position, shown in FIG. 6, to the lowered position, shown in phantom outline in FIG. 6, causes the guide bar 24B and cutting chain 24C of the chainsaw 24 to intersect face "E" of the workpiece in cutting relation, thereby to cut the workpiece along cutting plane "D". The cutting guide device 20 may then be returned to its raised position, moved along the translational axis "A" in the direction indicated by arrow "G" in FIG. 7, and the operation continued until the appropriate length has been cut. The cutting guide device 20 is further illustrated in a typical application in FIG. 8, namely, in the provision of a window opening in a vertically stacked log wall 22, an outline of said opening being shown in dotted line and indicated by letter "F". It will be appreciated that by subsequent repositioning of the cutting guide device 20 along the horizontal and vertical boundaries of outline "F", the desired opening may be cut in the general manner previously described.

In this further regard, it should be understood that, for the purpose of clarity in this specification and the claims appended hereto, the present invention has been described in relation to a particular and preferred use, namely, the provision of vertical cuts on a substantially vertically oriented workpiece 22, as shown in FIGS. 6, 7 and 8, and on this basis, reference is made in this specification and in the claims to various orientations of the parts of the present invention with relation to the horizontal and vertical. It will be appreciated that the teachings of the present invention may also be practiced with equal utility in relation to the provision of horizontal cuts, and the scope of the monopoly claimed extends also to uses of the present invention in such applications. Accordingly, it should be understood that the relative orientations of the various parts of the present invention to one another will change commensurately in such uses, and that the references in the claims and specification as to orientation are for purposes of description only and are non-limiting.

Finally, it should also be appreciated that in the preferred embodiment illustrated, face "E" which comprises the frontward exposed surface of the stacked log structure 22 illustrated, is shaped generally in the form of a series of longitudinal segments of a cylinder, vertically stacked upon one another, and mounting plane "B" is defined by the frontmost projections of face "E". However, the cutting guide device 20 could, alternatively, be mounted upon a planar workpiece, such as a series of stacked, square-cut timber, (not shown), in which case, face "E" and plane "B" would be coplanar. Again, the type of workpiece with which the present invention can be used is not limited to any particular form, and routine variation in respect thereto is well within the knowledge of those skilled in the art.

I claim:

1. A cutting guide device, for use with a chainsaw and a workpiece having a substantially vertical face to be cut, said chainsaw being of the type having a motor housing portion, a substantially planar guide bar portion rigidly projecting from said motor housing portion and a cutting chain portion surrounding a perimeter of said guide bar portion, said cutting guide device comprising:
   - a rail means adapted for selective, removable, rigid attachment to the face of said workpiece, said rail means defining a vertical translational axis when operatively attached to said face, and
   - a carriage means mounted on the rail means and adapted for constrained translational movement parallel to the vertical translational axis;
   - a turret means attached to the carriage means for translational movement therewith and adapted for pivotal rotation relative to said carriage means about a horizontal pivot axis disposed normal to the vertical translational axis; and
   - a chainsaw gripping means adapted to selectively, rigidly grip said chainsaw by the guide bar portion thereof with a cutting plane defined by the guide bar portion being vertically oriented and normal to said horizontal pivot axis, said gripping means being mounted on the turret means for rotation therewith, while gripping said chainsaw as aforesaid, between a raised position, whereat the guide bar portion and cutting chain portion of said chainsaw are disposed frontwardly from said face, and a lowered position, whereat said guide bar portion and cutting chain portion intersect said face in cutting relation, thereby to cut said workpiece along the cutting plane.

2. A cutting guide device according to claim 1, wherein the horizontal pivot axis is substantially parallel to a mounting plane defined by the face of said workpiece.

3. A cutting guide device according to claim 2, wherein the chainsaw gripping means is adapted to selectively, rigidly grip the chainsaw as aforesaid, with the cutting plane defined by the guide bar portion thereof oriented substantially normal to the mounting plane defined by the face of said workpiece.

4. A cutting guide device according to claim 3, wherein the turret means comprises a head portion and a shaft portion laterally extending from said head portion, the shaft portion being rotatably mounted to said carriage means for said pivotal rotation, the gripping means being mounted on the head portion for rotation therewith as aforesaid.

5. A cutting guide device according to claim 4, wherein the carriage means comprises a guide block, mounted on the rail means for said constrained translational movement parallel to the vertical translational axis, and a turret mounting plate, rigidly mounted upon the guide block.

6. A cutting guide device according to claim 5, wherein the carriage means further comprises a shaft receiving lug portion projecting frontwardly from said turret mounting plate, said shaft receiving lug portion having a substantially cylindrical bore therein centered about said horizontal pivot axis.

7. A cutting guide device according to claim 6, wherein the shaft portion is rotatably mounted as aforesaid within the cylindrical bore for said pivotal rotation about the horizontal pivot axis.

8. A cutting guide device according to claim 7, wherein the shaft portion is rotatably mounted within the cylindrical bore as aforesaid by means of a ring bearing assembly positioned within the bore of said lug portion, said ring bearing assembly comprising an inner race and a concentric outer race, said inner race and said outer race being rotatably mounted one within the other, said outer race being rigidly mounted to said lug portion, and said inner race being in frictionally-engaged surrounding receipt of said shaft portion.

9. A cutting guide device according to claim 8, wherein the carriage means has two frontwardly projecting shaft receiving lug portions, laterally spaced one from another, with respective cylindrical bores of said lug portions aligned one with another to accept said shaft portion within respective ring bearing assemblies mounted within said cylindrical bores as aforesaid.

10. A cutting guide device according to claim 9, wherein the chainsaw gripping means comprises a channel defined within the head portion of the turret means to accept, in throughpassing relation, the guide bar portion and the cutting chain portion of said chainsaw, said channel being oriented substantially transverse to the horizontal pivot axis and having a first sidewall, proximal to the shaft portion, and a second sidewall, laterally spaced in opposed relation from the first sidewall and distal to the shaft portion.

11. A cutting guide device according to claim 10, wherein the horizontal pivot axis passes through the channel.

12. A cutting guide device according to claim 11, wherein the chainsaw gripping means further comprises a backing plate rigidly mounted upon the first sidewall and projecting laterally into the channel for contacting relation with a first side of said guide bar portion.

13. A cutting guide device according to claim 12, wherein the chainsaw gripping means further comprises a clamping disc positioned in the channel substantially laterally spaced from the backing plate and means for adjustably, selectively urging said clamping disc towards the backing plate for contacting relation with an opposite side of said guide bar portion, thereby to clampingly grip said guide bar portion of the chainsaw between said clamping disc and said backing plate.

14. A cutting guide device according to claim 13, wherein the means for adjustably, selectively urging the clamping disc towards the backing plate comprises a threaded rod means extending from said clamping disc to a head member, said threaded rod means being operatively mechanically engaged in a threaded bore passing through the head portion of the turret means, said head member being manually engageable for rotation of said threaded rod means in said threaded bore.

15. A cutting guide device according to claim 14, wherein the rail means comprises a rib member and a mounting plate member, said mounting plate member being adapted for selective, removable, rigid attachment to the face of said workpiece, thereby to attach the rail means to the face as aforesaid, said rib member defining said vertical translational axis and having a back surface rigidly mounted upon a front surface of the mounting plate member.

16. A cutting guide device according to claim 15, wherein the rib member further comprises three bearing surfaces, said bearing surfaces comprising a front bearing surface and laterally disposed side bearing surfaces, each of said bearing surfaces being oriented substantially parallel to the vertical translational axis and having a respective generally centrally positioned slot therein oriented parallel to the vertical translational axis.

17. A cutting guide device according to claim 16, wherein the guide block comprises three guide surfaces, each guide surface being associated with a respective one of said bearing surfaces and disposed adjacent thereto.

18. A cutting guide device according to claim 17, wherein the carriage means further comprises three wear pads, each wear pad being rigidly mounted upon a respective one of the guide surfaces, each said wear pad being in sliding contact with the bearing surface associated with said respective one of the guide surfaces and having an alignment key received within the slot of said bearing surface, thereby to effect said constrained translational movement parallel to the vertical translational axis.

19. A cutting guide device according to claim 18, wherein the backing plate and the clamping disc are constructed from unhardened steel.

20. A cutting guide device according to claim 19, wherein the rib member comprises an extrusion.

21. A cutting guide device according to claim 20, wherein the rib member comprises an aluminum extrusion.

22. A cutting guide device according to claim 21, wherein the wear pads are formed from a durable material having high lubricity.

23. A cutting guide device according to claim 22, wherein the wear pads are formed from ultra high molecular weight polyethylene.

* * * * *